INVENTOR.
JOHN F. KINNEY
BY
Gordon H Cheney
AGENT

INVENTOR.
JOHN F. KINNEY
BY
AGENT

March 25, 1969   J. F. KINNEY   3,434,350
COMPENSATED TEMPERATURE SENSOR
Filed March 10, 1967

INVENTOR.
JOHN F. KINNEY
BY
Gordon N. Cheney
AGENT

United States Patent Office 3,434,350
Patented Mar. 25, 1969

3,434,350
COMPENSATED TEMPERATURE SENSOR
John F. Kinney, South Bend, Ind., assignor to The Bendix Corporation, a corporation of Delaware
Filed Mar. 10, 1967, Ser. No. 622,238
Int. Cl. G01k 1/20
U.S. Cl. 73—362.4                    7 Claims

ABSTRACT OF THE DISCLOSURE

A temperature responsive device having a positionable output member connected to a pair of liquid filled temperature responsive bellows, one of which is a motor bellows responsive to a variable input temperature and the temperature of an environmental fluid and connected to actuate the positionable output member in response to the variable input temperature signal and the other of which is a compensated bellows responsive to the temperature of the environmental fluid and connected to compensate for the temperature effect of the environmental fluid on the motor bellows.

Background of the invention

This invention relates to temperature responsive devices of the fluid filled bellows type having a probe exposed to the sensed temperature.

In conventional temperature responsive devices of the abovementioned type, the liquid filled motor bellows may be contained in a housing in which fluid such as liquid fuel in the case of a fuel control system for a combustion engine or air in the case of a pneumatic system circulates around the liquid filled motor bellows. Variations in the temperature of the surrounding fluid as well as the temperature to which the probe is subjected results in predetermined variations in the volume of the liquid filling the motor bellows which, in turn, results in corresponding movement of the movable end of the motor bellows and thus the positionable output member connected thereto. Therefore, the temperature of the fluid surrounding the motor bellows, unless compensated for, introduces an error in the response of the motor bellows such that position of the output member is not truly representative of the temperature to which the probe is subjected. Reference is made to Patent No. 3,177,720, issued Apr. 13, 1965, in the name of Lowell A. Metheny (common assignee) for a showing of a compensating bellows arrangement whereby the abovementioned undesirable effect of temperature variations of a fluid surrounding a motor bellows may be eliminated. The present invention is an improvement over the temperature compensating apparatus of said patent in that, in addition to compensating for the temperature effect of the fluid surrounding the motor bellows, the present invention also compensates for deviations in volume ratio between the motor bellows and compensator bellows. It will be recognized that an error resulting from such deviations is proportional to the variation in volume ratio from the design nominal volume ratio of the motor bellows and compensator bellows which error is at a maximum when the temperature of the fluid surrounding the bellows and the probe temperature are at opposite extremes.

Summary of the invention

It is an object of the present invention to provide temperature responsive control apparatus having a movable output member actuated by a fluid filled bellows as a predetermined function of a variable input temperature signal applied to the liquid filling the bellows irrespective of temperature variations in an environmental fluid surrounding the bellows.

It is another object of the present invention to provide simple and reliable temperature compensating apparatus for obviating the effect of environmental temperature changes on a liquid filled temperature responsive bellows connected to receive a variable temperature input signal and actuate a movable output member reliably and accurately as a function of the variable temperature input signal.

It is an important object of the present invention to provide temperature responsive control apparatus wherein a movable output member is caused to assume a specific position for each specific temperature sensed by a probe connected interiorly to a liquid filled bellows irrespective of temperature changes of a fluid surrouding the bellows.

Other objects and advantages will become apparent from the following description taken in conjunction with the accompanying drawings wherein:

Description of the preferred embodiment

Figure 2:
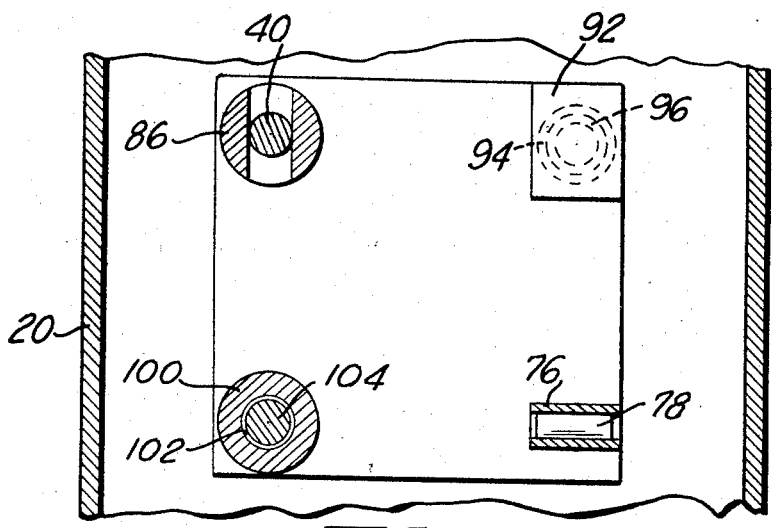
FIGURE 2 represents a view taken on line 2—2 of FIGURE 1.

Referring to the drawings, numeral 20 designates a casing containing fluid subject to variable temperature. A motor bellows 22 is supported for axial expansion or contraction relative to casing 20 by an anchor member 24 fixedly secured to one end of bellows 22 by any suitable means such as brazing or the like providing a fluid tight connection. A threaded extension 26 of anchor member 24 extends through an opening 28 in casing 20 into engagement with a lock nut 30 which is tightened to fixedly secure anchor member 24 in position against casing 20. An integral circular guide member 32 having spaced apart ribs 34 and 36 extends from anchor member 24 into bellows 22 which is axially aligned therewith. A cap 38 fixedly secured to bellows 22 by any suitable means, such as brazing, to provide a fluid tight connection is provided with a centrally located stem 40 and an oppositely extending cylinder portion 42 which is axially aligned with guide member 32 slidable therewith. The guide member 32 guides cylinder 42 and thus bellows 22 axially thereby avoiding any tendency of the bellows 22 to buckle under load. The guide member 32 is suitably bored axially to receive one end of a capillary tube 44 which is attached at its opposite end to a temperature probe 46. A diametrically extending passage 48 in guide member 32 communicates the interior of tube 44 with the annular space 50 defined by bellows 22 and guide member 32. The bellows 22, tube 44 and probe 46 are filled to capacity with a suitable liquid in the connectional manner of such temperature responsive devices. In general, the probe 46 is located to sense the temperature of some desired medium and in response to variations in the temperature of the medium the volume of the liquid within bellows 22 is caused to vary accordingly which, in turn, causes the bellows 22 to expand or contract depending upon the relative change in temperature of the medium.

Figure 1:
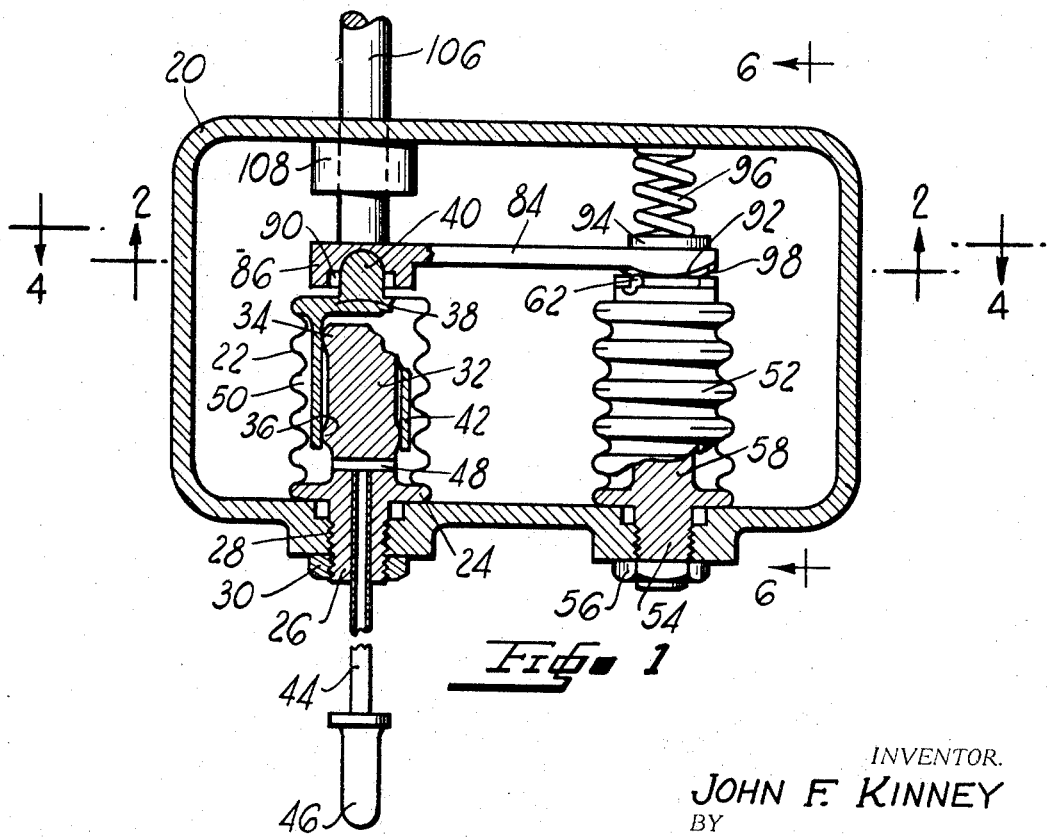
FIGURE 1 represents a front view in partial section of the present invention.
Figure 6:
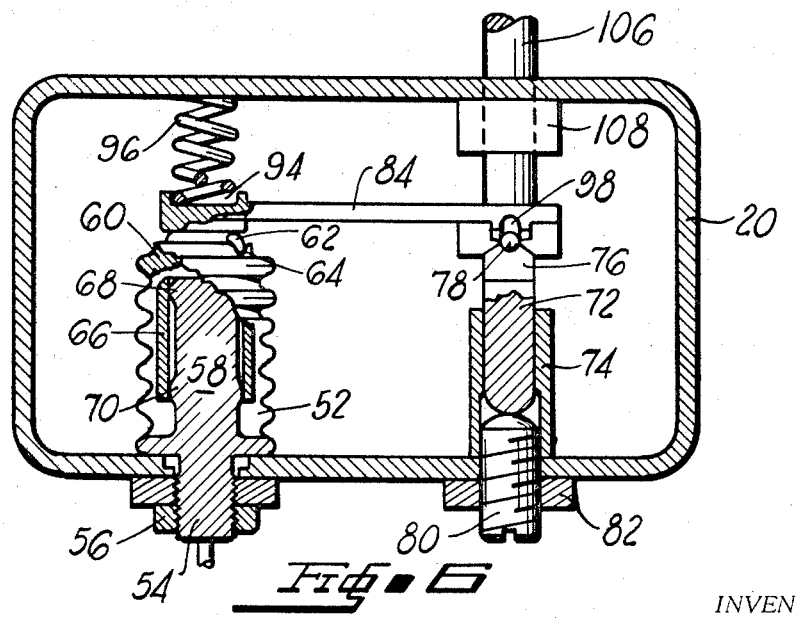
FIGURE 6 represents a view taken on line 6—6 of FIGURE 1.

A compensator bellows 52 is secured to casing 20 in spaced apart relationship to motor bellows 22 by an anchor member 54 and associated lock nut 56 threadedly engaged therewith. An integral guide member 58 extends from anchor member 54 into bellows 52 which is axially aligned therewith. A cap 60 suitably secured to the free end of bellows 52 by any suitable means such as brazing to provide a sealed connection is provided with a bearing surface which may be defined by a rod section 62 fixedly secured in a groove 64 in cap 60 (FIGURES 1 and 6). A cylinder portion 66 of cap 60 axially aligned with guide member 58 is adapted to slide over spaced ribs 68 and 70 formed on guide member 58 thereby guiding bellows 52. The motor bellows 22 and compensator bellows 52 are selected to contain equal interior fluid volumes at a predetermined temperature condition of probe 46 and are filled with fluid having the same response characteristics to changes in the temperature of the fluid contained by casing 20.

An adjustable support includes a stem 72 slidably carried in a sleeve 74 and a cross arm 76 recessed to receive a rod section 78 fixedly secured thereto by any suitable means such as a tack weld (FIGURES 2 and 6). The sleeve 74 is fixedly secured at one end to casing 20 by any suitable means such as a weld. A screw member 80 threadedly engaged with casing 20 extends therethrough into engagement with the end of stem 72. A lock nut 82 threadedly engaged with screw member 78 serves to lock the same in a desired position.

Figure 3:
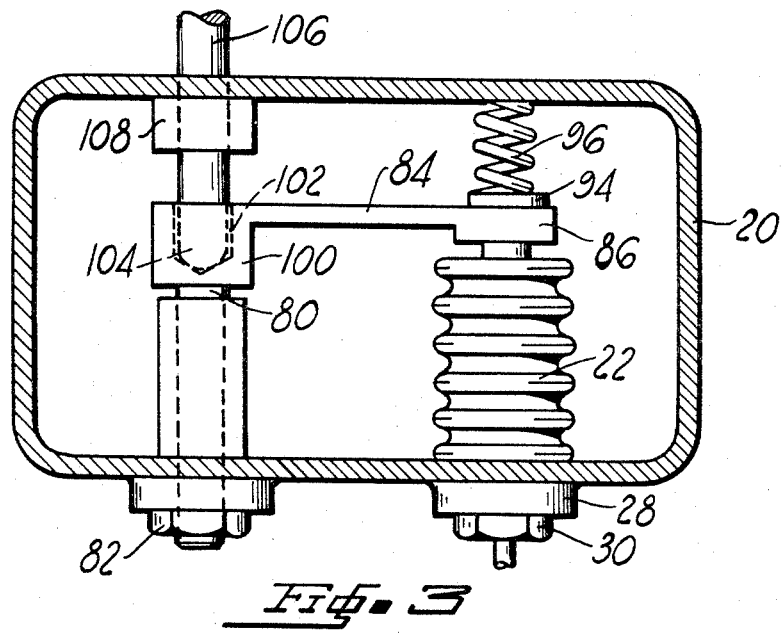
FIGURE 3 represents a left side view of the present invention.
Figure 4:
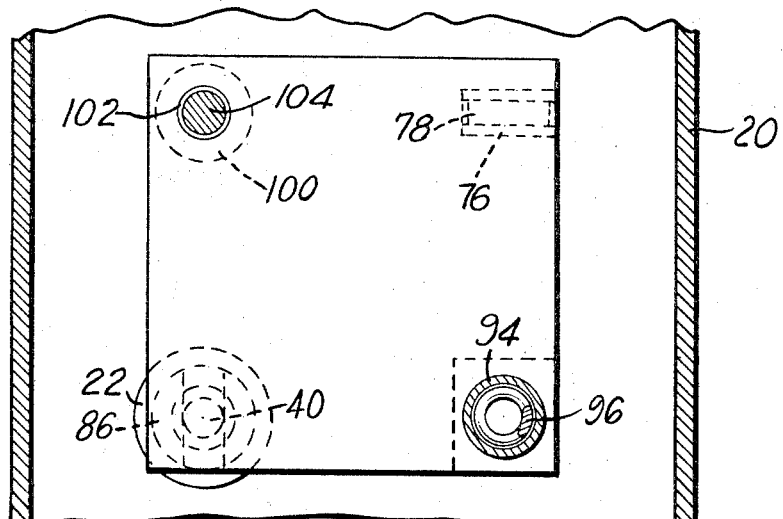
FIGURE 4 represents a view taken on line 4—4 of FIGURE 1.

A tiltable table defined by a square plate 84 is supported by the stem 40 and rod sections 62 and 78. Referring to FIGURES 3 and 4, in particular, one corner of the plate 84 is provided with a boss 86 having a slot or track 88 suitably curved to pivotally accommodate the curved end of stem 40 which bears thereagainst. A recess 90, FIG. 1, in boss 86 provides clearance for stem 40 to permit relative pivotal movement between plate 84 and stem 40.

A second corner of plate 84 is provided with a curved bearing surface 92 which rests upon rod portion 62 angularly disposed thereto and is carried by bellows 52. The bearing surface 92 and rod portion 62 have point contact thereby resulting in rolling action of bearing surface 92 on rod portion 62 in response to relative movement therebetween. The opposite face of plate 84 is recessed as at 94 to retain one end of a compression spring 96 interposed between casing 20 and plate 84 and adapted to load bearing surface 92 into engagement with rod portion 62 (FIGURE 6).

A third corner of plate 84 is provided with an arcuate track portion 98, best shown in FIGS. 4 and 6, having a suitable cross section radius of curvature to accommodate rod portion 78 bearing thereagainst. The radius of curvature of arcuate track portion 98 is the same as that of the curved bearing surface 92.

Figure 5:
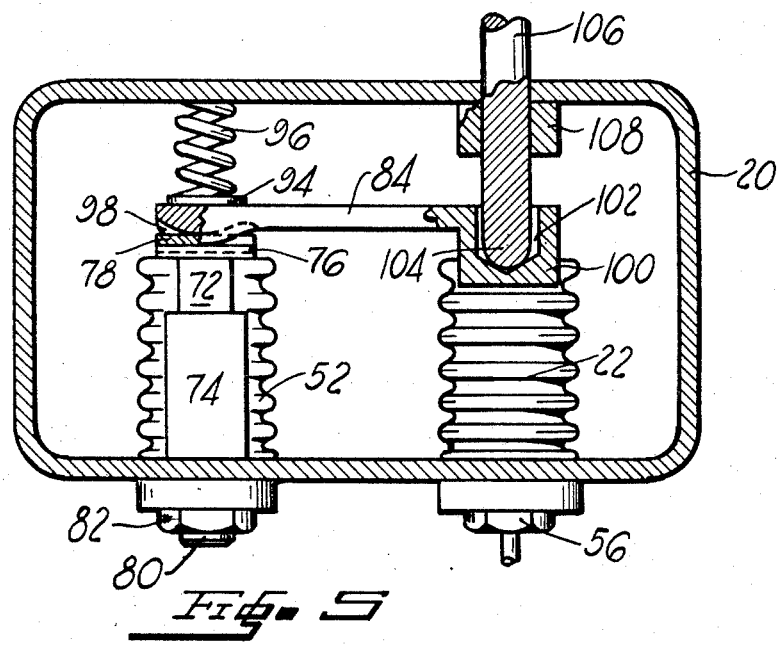
FIGURE 5 represents a rear view in partial section of the present invention.

The remaining corner of plate 84 is provided with a boss 100 suitably recessed as at 102, FIG. 5, to receive a curved end portion 104 of a rod 106. The radius of recess 102 is sufficiently greater than that of the rod 106 to permit a limited range of tilting motion of plate 84 relative to rod 106. The rod 106 extends through casing 20 and is slidably carried by a guide 108 fixedly secured to casing 20 by any suitable means such as a weld. Rod 106 provides an output position signal as a function of the temperature sensed by probe 46 and may be suitably attached to control means, not shown, responsive to the position established by rod 106.

*Operation*

It will be understood that the probe 46 is exposed to a variable temperature source and the casing 20 is exposed interiorly to a variable tempertaure fluid, either gas or liquid, which surrounds the bellows 22 and 52. It will be assumed initially that the temperature of the fluid surrounding bellows 22 and 52 is stabilized at some given value and that the temperature sensed by probe 46 increases by a given amount.

Under the above assumed conditions, the increase in temperature at probe 46 results in passage of fluid through capillary tube 44 from probe 46 to the interior of motor bellows 22 which expands accordingly thereby displacing stem 40 upwardly as viewed in FIGURE 1 which, in turn, urges the adjacent corner of plate 84 upwardly. The plate 84 pivots in a clockwise direction as a result of the bearing surface 92 rolling on rod portion 62 and the arcuate track portion 98 rolling on rod portion 78. The radius of curvature of the bearing surface 92 and the arcuate track portion 98 are equal which, in turn, results in the corner of plate 84 carrying output rod 106 moving with the same magnitude and direction as that of the motor bellows 22 actuating plate 84. Therefore, the rod 106 moves upwardly, as viewed in FIGURE 1, to provide an output position signal representing the position occupied by plate 84 which as indicated above represents the temperature at probe 46. It will be noted that a decrease in temperature at probe 46 will result in a contraction of motor bellows 22 which results in counterclockwise movement of plate 84, as viewed in FIGURE 1, as a result of the rolling action of bearing surface 92 and track portion 98 on the respective rod portions 62 and 78 whereupon the output rod 106 moves downwardly to provide a position signal representing the decreased temperature at probe 46.

Now, assuming that the temperature of probe 46 remains constant and an increase in temperature of the fluid surrounding bellows 22 and 52 occurs, the bellows 22 and 52 will react accordingly by expanding simultaneously. The plate 84 is lifted by the bellows 22 and 52 and pivots clockwise about the end of rod 106 and rod portion 78, as viewed in FIGURE 6, about an axis defined by a line through the center of curvature of the end 104 of rod 106 and the center of curvature of rod portion 78 thereby resulting in no output motion of rod 106. In this manner, the position of rod 106 remains fixed for any given temperature at probe 46 irrespective of the response of motor bellows 22 to changes in temperature of the fluid surrounding the same. It will be noted that a decrease in temperature of the fluid surrounding bellows 22 and 52 will result in a simultaneous contraction of both bellows whereupon the plate 84 will pivot counterclockwise, as viewed in FIGURE 6, about the aforementioned defined axis resulting in zero output motion of rod 106.

It will be understood that a change in temperature of the fluid surrounding the bellows 22 and 52 results in bellows travel which is proportional to the fluid volume content of the bellows at the instant of the temperature change. The fluid volume inequality between motor bellows 22 and compensator bellows 52 will be at a maximum when the probe temperature is at one extreme while the temperature of the fluid surrounding the bellows 22 and 52 is at the opposite extreme. Compensation for such volume inequality is provided for by means of the curved bearing surface 92 as well as the angular position of rod portion 62 relative to the bearing surface 92. The radius of curvature of curved bearing surface 92 and the angle of rod portion 62 upon which the bearing surface 92 rides determines the effective lever arm from the center of curvature of rod portion 78 to the point of contact of curved bearing surface 92 and rod portion 62 as well as the effective lever arm from the center of curvature of stem 40 to the point of contact of bearing surface 92 and rod portion 62 for a given length of compensator bellows 52. It will be assumed that the bellows 22 and 52 are selected with a nominal volume ratio of one at a predetermined temperature of probe 46 which, for instance, may correspond to a temperature midway between the highest and lowest temperatures to which the probe 46 is expected to be exposed. Referring to FIGURE 6, in particular, the bellows 22 and 52 are shown with equal volumes as they would appear in response to the abovementioned predetermined temperature at probe 46. The tiltable table 84 may be considered substantially perpendicular to the axes of the bellows 22 and 52.

As pointed out heretofore, a change in temperature at probe 46 will cause an expansion or contraction of bellows 22 depending upon the relative change in probe temperature which results in a volume error between motor bellows 22 and compensator bellows 52. For instance, the heretofore mentioned increase in volume of motor bellows 22 in response to an increase in probe 46 temperature results in a corresponding volume error between bellows 22 and 52. Now, if a subsequent increase in temperature of the fluid surrounding bellows 22 and 52 occurs, it will be recognized that the axial expansion of bellows 22 will be greater than the axial response of bellows 52 in response to the rise in temperature of the fluid surrounding the same by virtue of the volume error. The simultaneous expansion of bellows 22 and 52 is partially compensated for by the table 84 tilting about the axis through end 104 and rod portion 78 in the heretofore mentioned manner to prevent movement of output rod 106. However, the greater axial expansion of bellows 22 relative to bellows 52 tends to tilt table 84 in a clockwise direction, as viewed in FIGURE 1, about the axis defined by the points of contact of arcuate portion 98 and curved bearing surface 92 with rod portion 78 and rod portion 62, respectively, which clockwise tilting of table 84, without suitable compensation therefor, will produce undesired displacement of output rod 106 in an upward direction as viewed in FIGURE 1. To compensate for the tendency of table 84 to tilt clockwise in response to bellows 22, the curved bearing surface 92 which moves relative to rod portion 62 in response to the clockwise tilting of table 84 causes a counterclockwise tilting of table 84 about the center of stem 40 as viewed in FIGURE 1 to reset table 84 thereby eliminating the abovementioned tendency for table 84 to tilt and cause motion of output rod 106. It will be recognized that the degree to which the motion of curved bearing surface 92 relative to rod portion 62 results table 84 depends upon the contour impressed on curved bearing surface 92 and/or rod portion 62.

In the event that a decrease in probe 46 temperature reduces the volume of bellows 22 to less than that of bellows 52, the resulting volume ratio error therebetween will cause the response of bellows 22 to be less than that of bellows 52 to a subsequent change in temperature of the fluid surrounding bellows 22 and 52. The resulting actuation of table 84 will be similar to that heretofore described but in a reverse sense so that the table 84 is reset by the curved bearing surface 92 movement relative to rod portion 62 to prevent movement of output rod 106 in response to changes in the fluid surrounding bellows 22 and 52 irrespective of any variation in volume between bellows 22 and 52. Thus, by matching the radius of curvature of bearing surface 92 and angle of rod portion 62 relative thereto with reference to the degree of expansion of motor bellows 22 in response to a given incremental temperature change at probe 46 over the range of operating temperatures, the abovementioned effective lever arm may be suitably varied to achieve the necessary compensation. The stem 72 and thus rod portion 78 attached thereto which supports one corner of plate 84 may be adjusted to vary the position of output rod 106 for calibration purposes by turning screw member 80 as will be recognized by those persons skilled in the art.

Although only one embodiment of the present invention has been illustrated and described, it will be apparent to those persons skilled in the art that various changes in the structure and relative arrangement of parts may be made to suit individual requirements without departing from the spirit and scope of the present invention.

I claim:

1. Temperature responsive apparatus responsive to two independently variable temperature sources defined by a sensed variable temperature and an environmental variable temperature for actuating a positionable output member wherein compensating means is provided for eliminating the effect of the environmental temperature thereby rendering the position of the output member indicative of the sensed temperature only, said apparatus comprising:

a casing defining a fluid filled chamber wherein the temperature of the fluid is subject to variation;

a first variable volume chamber mounted in said fluid filled chamber and filled with a temperature responsive medium which expands and contracts in response to variations in the sensed temperature as well as the temperature of the fluid surrounding the same;

a second variable volume chamber mounted in said fluid filled chamber in spaced apart relationship to said first variable volume chamber and adapted to expand and contract in response to variations in the temperature of the fluid surrounding the same;

a support member secured to said casing in spaced apart relationship to said first and second variable volume chambers;

tiltable table means;

first means including a curved bearing surface operatively connecting said tiltable table means to said output member for actuating said output member in response to movement of said tiltable table means;

second means including a curved bearing surface operatively connecting said tiltable table means to said support member for pivotal movement on said curved bearing surface;

third means including a curved bearing surface operatively connecting said tiltable table means to said first variable volume chamber for actuating said tiltable table means in response to movement of said first variable volume chamber;

fourth means including a curved bearing surface operatively connecting said tiltable table means to said second variable volume chamber for actuating said tiltable table means in response to movement of said second variable volume chamber;

said tiltable table means being actuated by said first variable volume chamber in response to a variation of said sensed temperature and movable about an axis passing through a point of contact of said curved bearing surface of said second means with said support member and a point of contact of said curved bearing surface of said fourth means with said second variable volume chamber thereby actuating said output member accordingly;

said tiltable table means being actuated by said first and second variable volume chambers in response to a variation in temperature of the fluid surrounding said chambers and movable about an axis passing through the center of curvature of said curved bearing surface of said first means and the center of curvature of said curved bearing surface of said second means thereby rendering the position of said output member constant irrespective of the response of said first variable volume chamber to said variation in temperature of the fluid surrounding the same.

2. Temperature responsive apparatus as claimed in claim 1 wherein:

said tiltable table means is a substantially flat plate having the curved bearing surfaces of said first, second, third and fourth means arranged in fixed spaced apart relationship thereon;

said curved bearing surfaces of said second and fourth means are defined by arcuate portions provided with the same radius of curvature.

3. Temperature responsive apparatus as claimed in claim 2 wherein:

said second variable volume chamber includes an elongated circular member fixedly secured thereto and movable therewith;

said circular member being arranged with its axis angularly disposed relative to said curved bearing surface of said fourth means and engageable therewith to thereby establish a variable effective lever arm between said first and second variable volume chambers, said variable effective lever arm varying as a function of the degree of expansion of said first variable volume chamber in response to said sensed temperature as a result of relative motion between said circular member and said curved bearing surface of said fourth means produced by movement of said flat plate in response to said first variable volume chamber to thereby compensate for the greater or less expansion rate of said first variable volume chamber relative to said second variable volume chamber for a given variation in temperature of the fluid surrounding the same.

4. Temperature responsive apparatus as claimed in claim 1 wherein:
said first and second variable volume chambers are first and second bellows, respectively, filled with a temperature responsive fluid;
said first bellows being connected interiorly to a probe exposed to the temperature to be sensed;
said first and second bellows being exposed exteriorly to said variable temperature fluid contained by said casing.

5. Temperature responsive apparatus as claimed in claim 4 wherein:
said first bellows is provided with a curved member fixedly secured to the movable end thereof and adapted to engage said curved bearing surface of said third means;
said second bellows is provided with an elongated circular member fixedly secured to the movable end thereof and angularly disposed relative to said curved bearing surface of said fourth means engageable therewith;
said support member having an elongated circular member fixedly secured thereto;
said curved bearing surface defined by said second means defining an arcuate track having a cross section curved to mate with said circular member of said support member;
said arcuate track and said curved bearing surface having the same radius of curvature.

6. Temperature responsive apparatus as claimed in claim 1 wherein:
said tiltable table means is a substantially square flat plate having each corner portion thereof provided with a respective one of said first, second, third and fourth means fixedly secured thereto.

7. Temperature responsive apparatus as claimed in claim 1 and further including:
spring means operatively connected to said tiltable table means for imposing a force thereon opposing expansion of said second variable volume chamber.

References Cited

UNITED STATES PATENTS

| | | | |
|---|---|---|---|
| 2,398,158 | 4/1946 | Ray | 236—86 |
| 2,458,610 | 1/1949 | Lindstrom | 73—362.5 X |
| 2,732,849 | 1/1956 | Rosenberger et al. | 73—362.5 X |
| 3,177,720 | 4/1965 | Metheny | 73—362.4 |
| 3,259,315 | 7/1966 | Gray et al. | 236—37 |

LOUIS R. PRINCE, *Primary Examiner.*

D. M. YASICH, *Assistant Examiner.*

U.S. Cl. X.R.

73—368.7